United States Patent
Biskup

(10) Patent No.: US 9,000,731 B2
(45) Date of Patent: Apr. 7, 2015

(54) BATTERY DISCHARGE SYSTEM AND METHOD OF OPERATION THEREOF

(75) Inventor: Richard J. Biskup, Sunnyvale, CA (US)

(73) Assignee: Atieva, Inc., Redwood City, CA (US)

( * ) Notice: Subject to any disclaimer, the term of this patent is extended or adjusted under 35 U.S.C. 154(b) by 329 days.

(21) Appl. No.: 13/355,372

(22) Filed: Jan. 20, 2012

(65) Prior Publication Data

US 2013/0187616 A1    Jul. 25, 2013

(51) Int. Cl.
*H01M 10/46* (2006.01)
*B60L 3/00* (2006.01)
*B60L 3/04* (2006.01)
*H01M 10/44* (2006.01)
*H02J 7/00* (2006.01)

(52) U.S. Cl.
CPC ............. *H01M 10/44* (2013.01); *B60L 3/0046* (2013.01); *B60L 3/04* (2013.01); *H02J 7/0031* (2013.01); *H02J 7/0032* (2013.01)

(58) Field of Classification Search
CPC .... H02J 7/06; H02J 7/0063; H02J 2007/0067
USPC .................. 320/135, 136, 116, 118, 119, 150
See application file for complete search history.

(56) References Cited

U.S. PATENT DOCUMENTS

| | | | |
|---|---|---|---|
| 6,232,744 B1 * | 5/2001 | Kawai et al. ................... | 320/132 |
| 7,019,488 B2 * | 3/2006 | Nakao ........................... | 320/104 |
| 7,755,331 B2 * | 7/2010 | Kawahara et al. ............ | 320/164 |
| 8,103,401 B2 * | 1/2012 | Kubo et al. ................... | 701/34.1 |
| 8,531,160 B2 * | 9/2013 | Moorhead et al. ............ | 320/136 |
| 2013/0106362 A1 * | 5/2013 | Mackintosh et al. ......... | 320/136 |

* cited by examiner

*Primary Examiner* — Edward Tso
(74) *Attorney, Agent, or Firm* — Womble, Carlyle, Sandridge & Rice

(57) ABSTRACT

A battery based power supply assembly is disclosed. The system comprises a discharge initiating device and a plurality of battery modules electrically connected with one another. Each of the battery modules comprises a plurality of battery cells, a discharge load connected in series with the battery cells, a switch coupled between the battery cells and the discharge load, a temperature sensor, and a controller adapted for placing the switch in its electrically connected state upon being driven by the discharge initiating device. The invention further provides a safe method of draining the energy from the power supply assembly disclosed herein.

7 Claims, 4 Drawing Sheets

BATTERY DISCHARGE SYSTEM AND METHOD OF OPERATION THEREOF

CROSS REFERENCE TO RELATED APPLICATIONS

N/A

FIELD OF THE INVENTION

Present invention relates to a discharge system for decommissioning of a battery pack, and, in particular, but not exclusively, provides a safe method of draining the energy from the battery pack used in motor vehicles, solar energy storage, or grid storage applications.

BACKGROUND OF THE INVENTION

The demand for automobiles with electric propulsion is increasing due to the diminishing oil supply and concerns on Carbon emission to the atmosphere. Promising solutions including pure electric, and hybrid electric or fuel cell based motor vehicles. Each solution requires a battery pack with significant energy content, typically from 9 KWh for a small hybrid electric car to 300 KWh for EV buses. When such vehicle is decommissioned either due to accident or damages beyond repair, there is still significant energy stored in the battery pack. Furthermore, thermal management system might have been impaired to the point that battery cells are no longer protected. For vehicles involved in an accident, vehicle impact may have caused damages to the battery housing. Some battery cells may also have been damaged. Battery cells are known to have very long delay time between initial impact damage to short circuit. Battery packs 3 weeks after impact study have been reported to have caused vehicle fires. It is desirable to have a battery discharge system to safely drain away the stored energy to ensure the safety of the decommissioned battery pack.

FIG. 2 shows a typical battery module 100, with 5 battery cells, 101 through 105 connected in series. A typical battery system may have 20 of such modules connected in series, or for a total of 100 battery cells connected in series. For battery cells with Lithium Iron Phosphate technology, each cell output voltage is about 3.2 Volts. The battery system would have a total of 320 volts between its positive and negative terminals. Battery cell may be constructed by a single 100 Amp-hour prismatic cell, or a string of 50 smaller cylindrical format cells, each having 2 Amp-hour capacity, connected in parallel. When fully charged, total energy contained in this battery pack is 32 KW-hour, enough to power a small electric vehicle for 100 kilometers. When such vehicle is involved in an accident, the high energy content may be ignited, causing a vehicle fire, or be shorted to the chassis, causing a shock hazard to passengers and rescue works, or go dormant, until weeks later when one or more damaged cells developed into short circuit, and the energy released in the form of smoke, fire, or shock hazard. It is desirable to drain the battery energy away after such an accident. Prior art solution calls for external load, such as resistor bank, be connected to the battery terminal in order to drain away the stored energy. However, if the battery electrical circuit is damaged, for example, an open circuit developed in between battery cell 102 and 103, then the entire circuit is open, and the external solution does not work. Another scenario is that the pack is fully charged, but one cell, 104, is near empty (or low state of charge) due to impact damage, or charge imbalance. When an external resistor bank is connected to the battery system, cell 104 resistance increased very quickly due to the cell chemistry at low state of charge, and prevent the energy from other cells be depleted to the resistor bank. It is desirable to find a safe solution that has high probability of successfully draining the energy from a damaged battery pack in a controlled manner. It is desirable to find an automatic solution that can quickly drain the energy from a damaged pack as quickly after the incident as possible.

It is desirable to automatically and safely draining away the stored energy immediately following an accident to minimize safety risk to passengers as well as rescue workers. It is desirable to lower the energy stored in a battery pack to provide operational safety for the person transporting the decommissioned battery pack and the person guarding the warehouse where the decommissioned battery pack is stored.

SUMMARY OF THE INVENTION

A battery discharge system comprises of a controller board with low input voltage, and a plurality of switched discharge elements across battery array is disclosed. The battery discharge system can be manually activated or automatically activated based on external sensors that detected a trigger condition such as vehicle crash, vehicle fire, or vehicle flipping over, or vehicle under water.

Therefore, the invention provides a power supply assembly having a forced-discharge mechanism. The power supply assembly comprises a discharge initiating device and a plurality of battery modules electrically connected with one another. Each of the battery modules comprises a plurality of battery cells electrically connected with one another, at least one discharge load connected in series with the battery cells, at least one switch coupled between the battery cells and the discharge load, and a controller adapted for placing the switch in its electrically connected state upon being notified by the discharge initiating device.

The invention further provides a process of forced discharging of electric power from a power supply assembly of an electric vehicle. The power supply assembly comprises a discharge initiating device and a plurality of battery modules electrically connected with one another. Each of the battery modules comprises a plurality of battery cells, a discharge load connected in series with the battery cells, a switch coupled between the battery cells and the discharge load, a temperature sensor, and a controller adapted for placing the switch in its electrically connected state upon being notified by the discharge initiating device. The inventive process comprises:

a) allowing the controller to receive a discharge initiating signal from the discharge initiating device;

b) allowing the controller to verify, upon receiving a reading of a temperature of the battery module as measured by the temperature sensor, that the temperature is lower than a predetermined safety threshold; and c) placing the switch in its electrically connected state to permit the battery cells in the battery module to discharge electric power via the discharge load.

In a preferred embodiment, the step c) described above further comprises the sub-steps of:

c1) placing the switch in its electrically connected state to permit the battery cells in the battery module to discharge electric power via the discharge load for a predetermined time period;

c2) measuring a power level remaining in the battery module; and c3) carrying out the step b), if the power level of the battery module is higher than a danger threshold.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
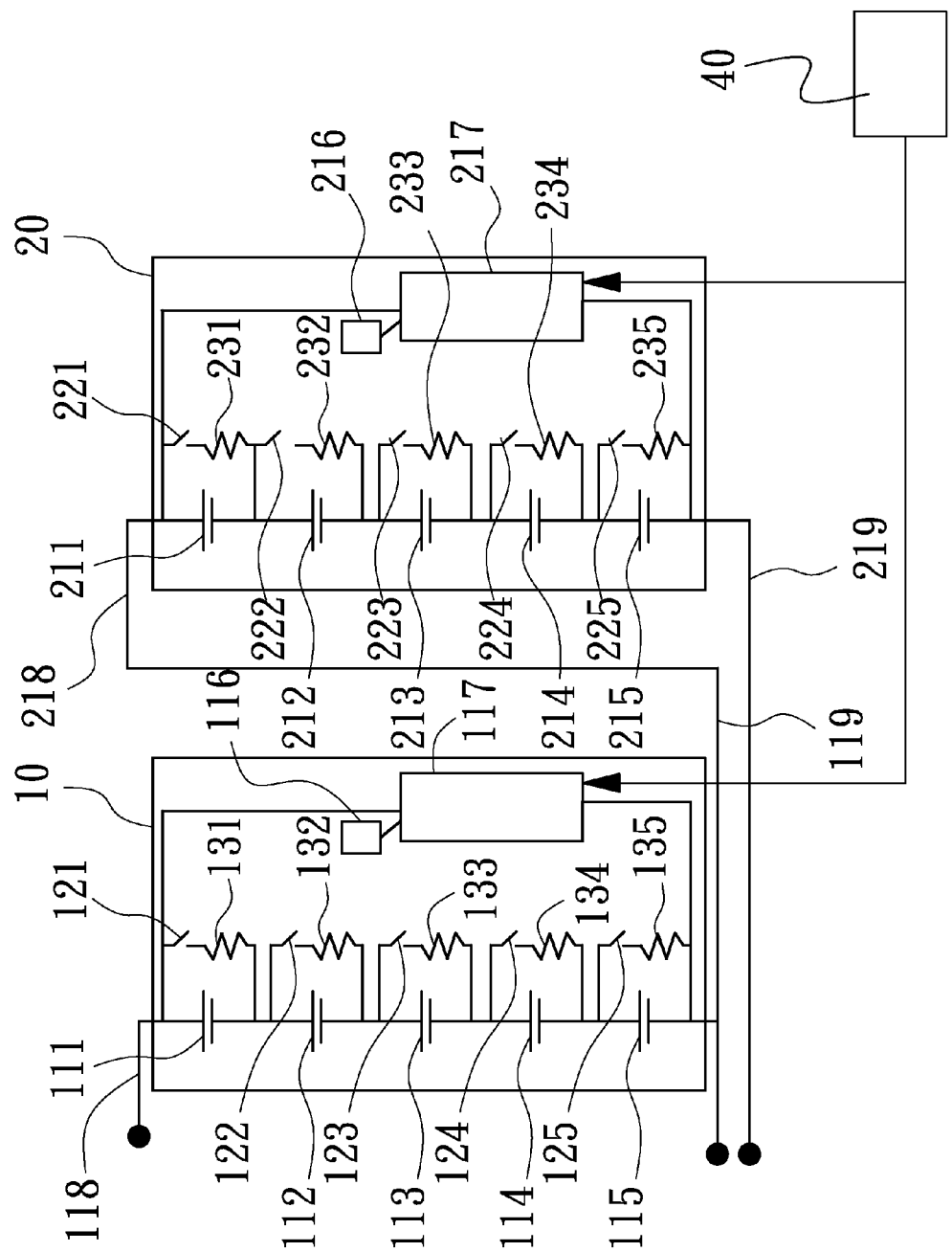
FIG. 1 is a preferred embodiment of a battery discharge system.
Figure 2:
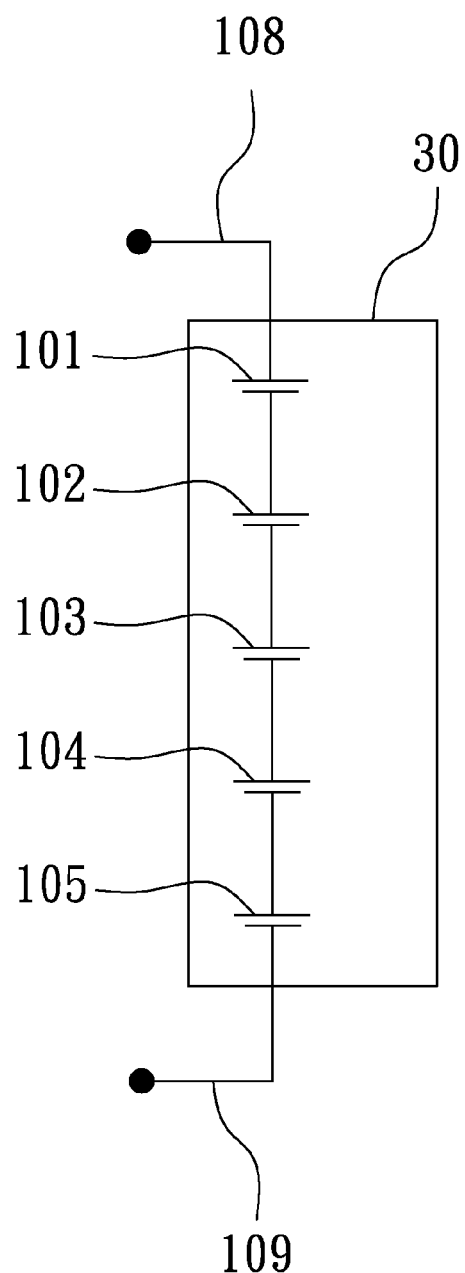
FIG. 2 is a typical battery module circuit diagram.

FIG. 1 shows a preferred embodiment of the present invention. Across each serially connected battery cell, for example, 111, there is a switch 121, and a load 131 connected across it. A battery module 10 consist of 5 of this serially connected battery cells, 111-115. A controller, such as a low power controller 117, is connected across terminals 118, 119, for its operation. The voltage requirement of controller 117 is low, even with 4 out of 5 serially connected cells having short-circuited, one single cell voltage can supply the necessary power for its operation. Switches 121, 122, 123, 124, 125 are controlled by the controller 117. When these switches are closed, battery cells 111-115 are discharged through their respective loads 131-135. While not shown, voltages across battery cells 111-115 are monitored by the controller 117. A temperature sensor 116 is placed near the battery cells. Controller 117 and its peripheral circuit (not shown) are contained in a rugged housing that has a high probability of surviving shock and vibration resulting from a crash event, and can operate safely under water. There is also a sensor 40 connected to controller 117 signifying that an event has occurred and all battery cells must be discharged. Sensor 40 detecting crash, roll over, water incursion, fire, smoke, and other catastrophic events are located within the vehicle, and have connections to controller 117 in module 10, controller 217 in module 20 and controllers in all other modules within a battery system. When a crash event occurred, controllers within each module can detect it, and proceed to discharge battery cells within each module. It is useful to have a single switch, a "panic button" that can be pressed to initiate discharging of the entire battery pack. In a crash event, it is likely some electrical connections are broken that renders affected circuit inoperative. In this preferred embodiment, the battery pack consists of 20 different modules, each with its own discharge controller. Most module electronics will survive the crash event and proceed to discharge battery cells within its control. It is recognized that some controllers, such as 117, and 217 may be damage and not functional, or their power connections cut and render them not functional. As shown in FIG. 1, module terminals, 118, 119, 219 are brought out into a convenient location where rescue workers can connect external loads to initiate discharge.

Controller 117 can monitor the temperature reading from the sensor 116 in order to determine whether it is safe to conduct discharge operations. Switch elements 121-125 may consist of bipolar transistors (BJT), field effect transistors (FET), or any other known devices that can perform the switching operation. Loads 131-135 may consist of any type of resistive element that can dissipate power when current is conducted through it Impact sensors may consist of triaxial accelerometers, or signals derived from the activation of air bags. Event sensor information could also be located elsewhere in a vehicle, and transmitted via communication links such as Canbus, I2C bus, RS-232 bus to each controllers. In this case, catastrophic events such as engine fire, cabin fire can also trigger battery discharge operation.

Figure 3:
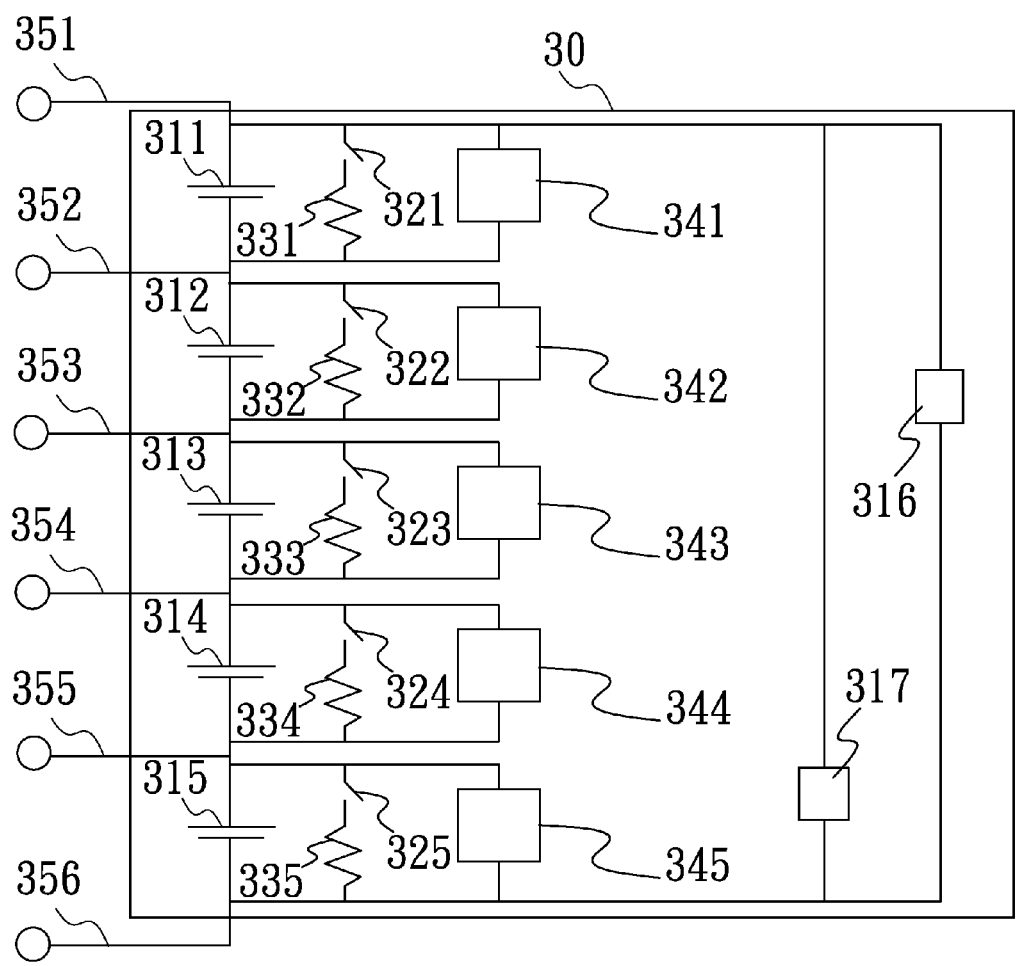
FIG. 3 is a preferred embodiment of a battery discharge system.

FIG. 3 shows another preferred embodiment of the present invention. Across each serially connected battery cell, for example, 311, there is a switch 321, and a load 331 connected across it. A battery module 30 consist of 5 of this serially connected battery cells, 311-315. A low power controller 341 is connected across terminals 351, 352, for its operation. The voltage requirement of controller 341 is low, one single cell voltage can supply the necessary power for its operation. Switches 321-322 are controlled by their respective controllers 341-345. When these switches are closed, battery cells 311-315 are discharged through their respective loads 331-335. While not shown, voltages across battery cells 311-315 are monitored by controllers 341-345. Controller 341-345 and its peripheral circuit (not shown) are contained in one or more rugged housings that has a high probability of surviving shock and vibration resulting from a crash event, and can operate safely under water. Also not shown are sensors connected to controller all controllers 341-345 signifying that an event has occurred and battery must be discharged. Sensors detecting crash, roll over, water incursion, fire, smoke, and other catastrophic events are located within the vehicle, and have connections to controllers 341-345 in module 30, and controllers in all other modules within a battery system. When a crash event occurred, controllers within each module can detect it, and proceed to discharge battery cells within each module. In a crash event, it is likely some electrical connections are broken that renders affected circuit inoperative. In this preferred embodiment, the battery pack consists of 20 different modules, each with 5 independent discharge controllers. Most module electronics will survive the crash event and proceed to discharge battery cells within its control. It is recognized that some controller, such as 341, and 345 may be damage and not functional, or their power connections cut and render them not functional. As shown in FIG. 3, external terminals, 351-356 are brought out into a convenient location where rescue workers can connect external loads to initiate discharge. Indicators can be placed nearby external terminals (not shown) to show the percentage of power left within each pair of terminals for rescue workers.

Low power temperature sensors 316, 317 were shown powered by the serial stack between 351 and 356. They could also be powered by other means. Both temperature sensors provide separate and redundant readings to controllers 341-345 in order to determine whether it is safe to conduct discharge operations. Switch elements 321-325 may consist of bipolar transistors (BJT), field effect transistors (FET), or any other known devices that can perform the switching operation. Loads 331-335 may consist of any type of resistive element that can dissipate power when current is conducted through it.

Figure 4:
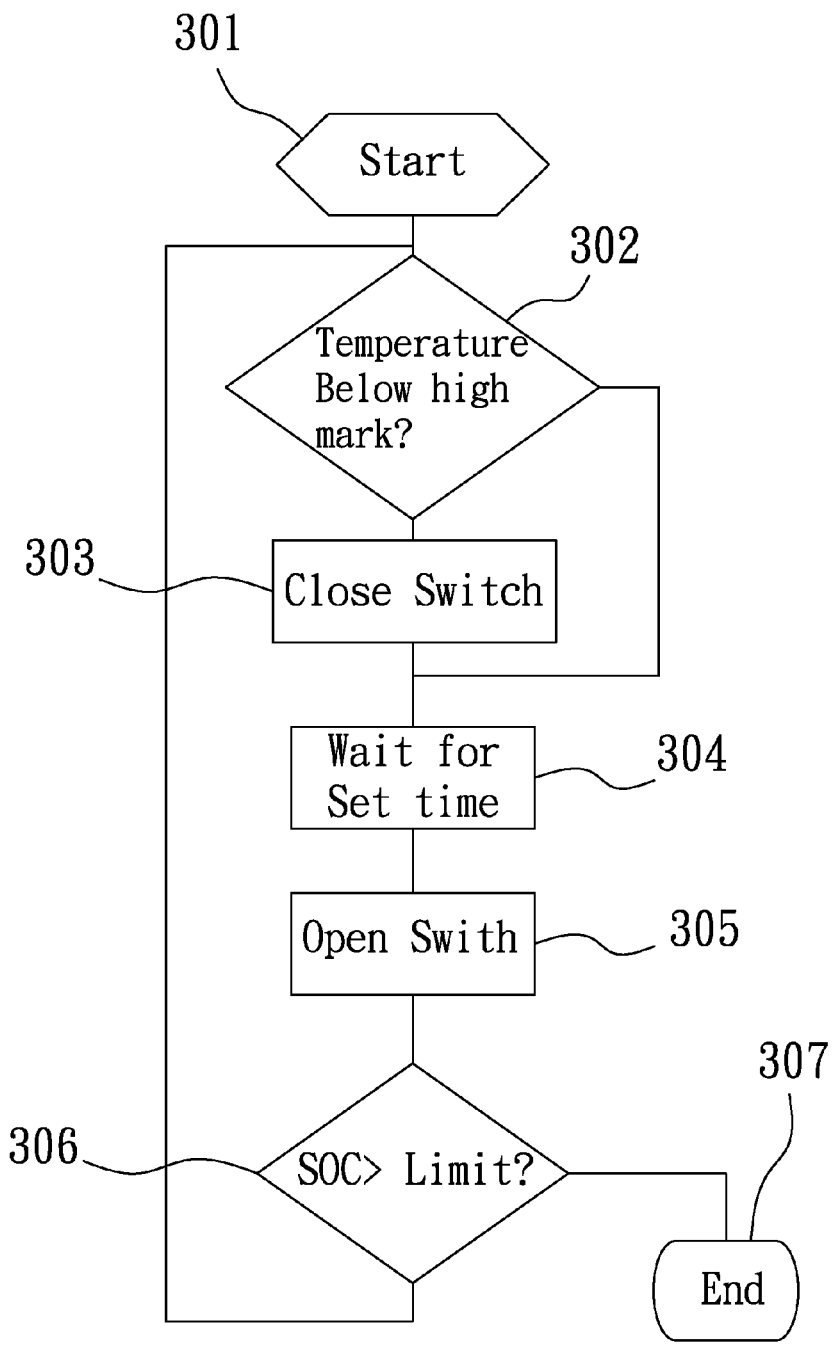
FIG. 4 is a process diagram depicting the preferred method of operation for the discharge system.

FIG. 4 is a process diagram depicting the preferred method of operation for the discharge system. The controller is adapted to receive a discharge initiating signal from a discharge initiating device, which may by way of example be an automobile central processing unit connected to a panic button that can be pressed to initiate discharging, or one or more sensors for detecting a trigger condition. When the controller detected through the sensor(s) or the panic button that discharge operation should start, the controller initiates step 401. In step 402, controller assess whether temperature within the module allows for safe discharge operation. Only when temperature is low enough for safe discharge operation then controller closes switches to enable discharge. The controller 117 in module 10 may elect to close all switches 121-125 simultaneously to initiate discharging for cells 111-115, or to close only some of the switches at a time to prevent temperature from going above limit After waiting for a set period of time 404, switches are opened and the amount of charge remaining in each cell or state of charge (SOC) is measured. If SOC is above the safety limit, then the process goes to step 402 and repeat the process. If SOC is at the safety limit then the process ends at 407.

The embodiments described herein are not intended to be exhaustive or limiting. The present invention is limited only by the following claims.

What is claimed is:

1. A battery based power supply assembly having a forced-discharge mechanism, comprising a discharge initiating device and a plurality of battery modules electrically connected with one another, each of the battery modules comprising:
   a plurality of battery cells electrically connected with one another;
   at least one discharge load connected in series with the battery cells;
   at least one switch coupled between the battery cells and the discharge load; and
   at least one controller adapted for placing the switch in its electrically connected state in reaction to determining a temperature within the battery module is below a safe discharge threshold, upon being notified by the discharge initiating device.

2. The battery based power supply assembly according to claim 1, wherein each of the battery modules further comprises at least one temperature sensor for detecting a temperature of the battery cells thereof and transmitting a reading of the detected temperature to the controller.

3. The battery based power supply assembly according to claim 1, wherein the discharge initiating device comprises an impact sensor.

4. The battery based power supply assembly according to claim 1, wherein the discharge initiating device is an automobile central processing unit.

5. The battery based power supply assembly according to claim 1, wherein the battery modules having their electrical connections brought out to at least one common external port.

6. A process of forced discharging of electric power from a battery based power supply assembly of an electric vehicle, wherein the power supply assembly comprises a discharge initiating device and a plurality of battery modules electrically connected with one another, each of the battery modules comprising a plurality of battery cells, a discharge load connected in series with the battery cells, a switch coupled between the battery cells and the discharge load, a temperature sensor, and a controller adapted for placing the switch in its electrically connected state upon being notified by the discharge initiating device, the process comprising:
   a) allowing the controller to receive a discharge initiating signal from the discharge initiating device;
   b) allowing the controller to verify, upon receiving a reading of a temperature of the battery module as measured by the temperature sensor, that the temperature is lower than a predetermined safety threshold; and
   c) placing the switch in its electrically connected state to permit the battery cells in the battery module to discharge electric power via the discharge load, responsive to determining that the temperature of the battery module is lower than the predetermined safety threshold.

7. The process according to claim 6, wherein the step c) further comprises the sub-steps of:
   c1) placing the switch in its electrically connected state to permit the battery cells in the battery module to discharge electric power via the discharge load for a predetermined time period;
   c2) measuring a power level remaining in the battery module; and
   c3) repeating the step b), if the power level of the battery module is higher than a danger threshold.

* * * * *